Sept. 1, 1925.
S. H. CROCKER
1,551,644
CINEMATOGRAPHIC APPARATUS
Filed Jan. 11, 1924   4 Sheets-Sheet 1
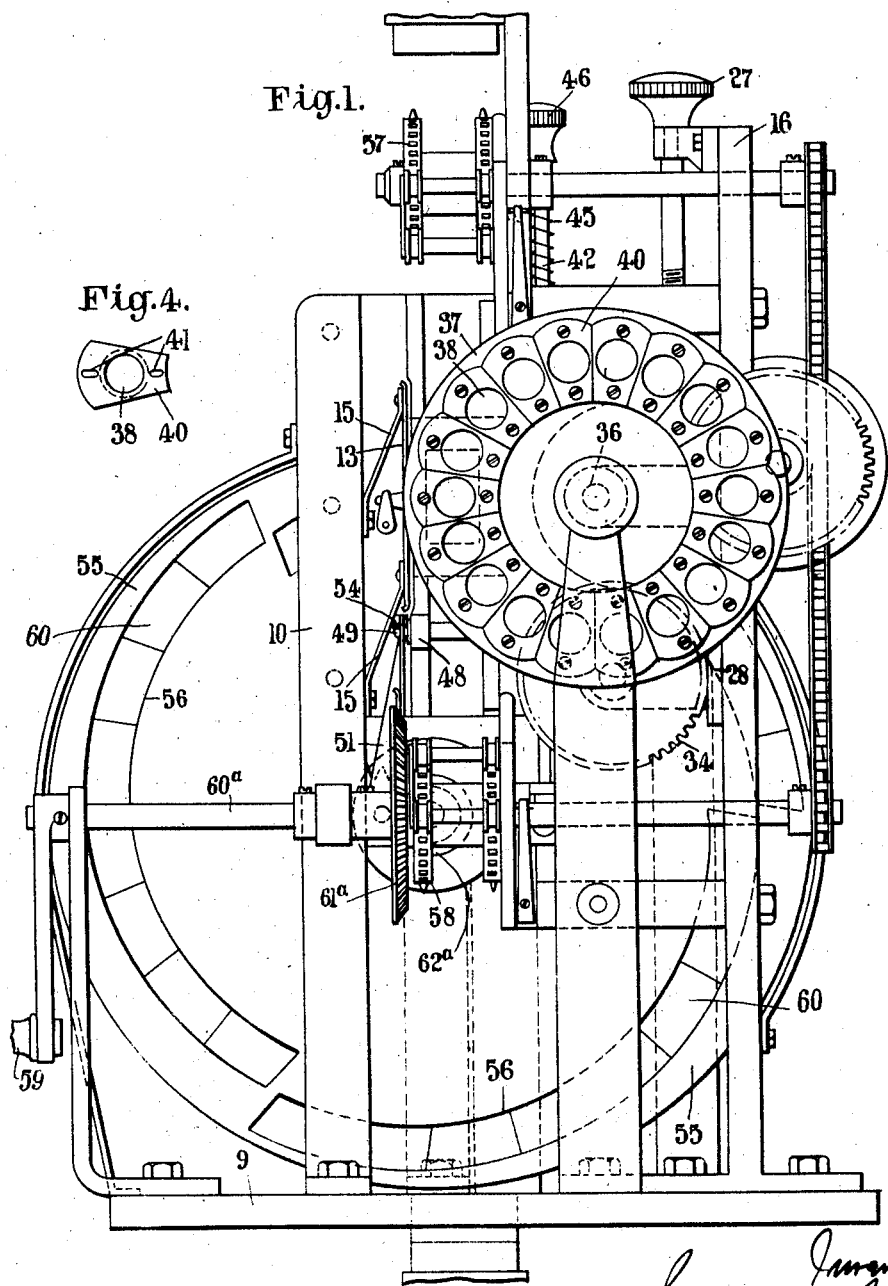

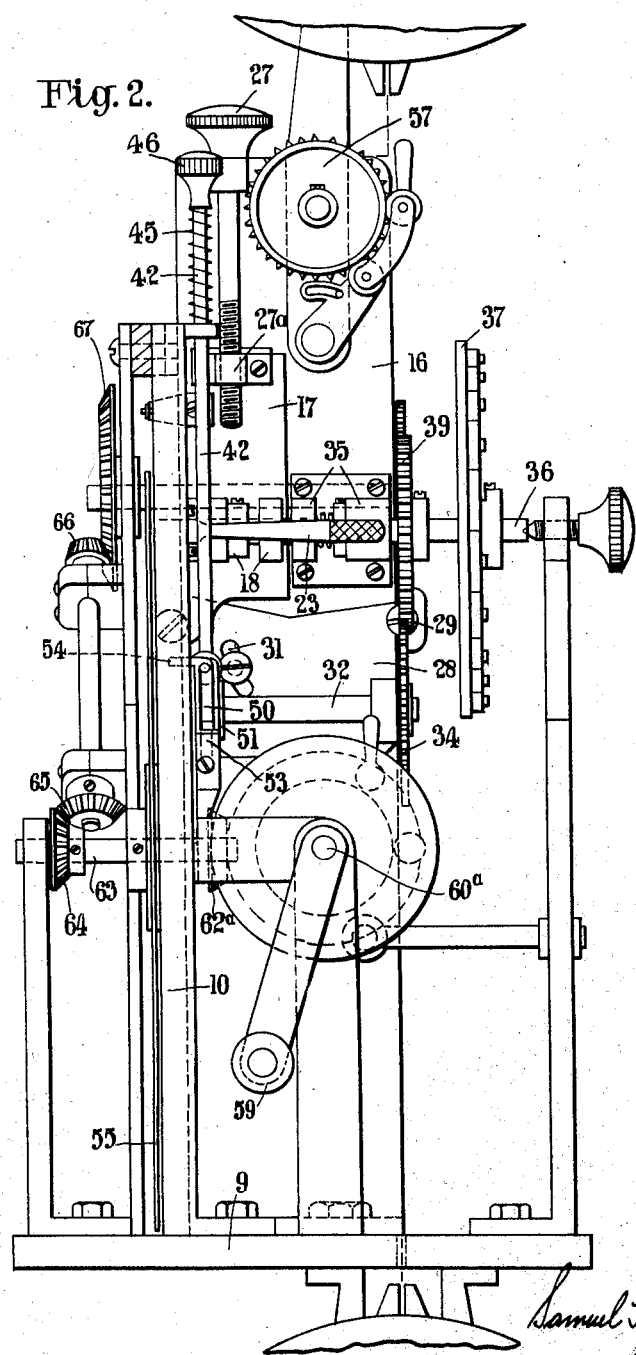

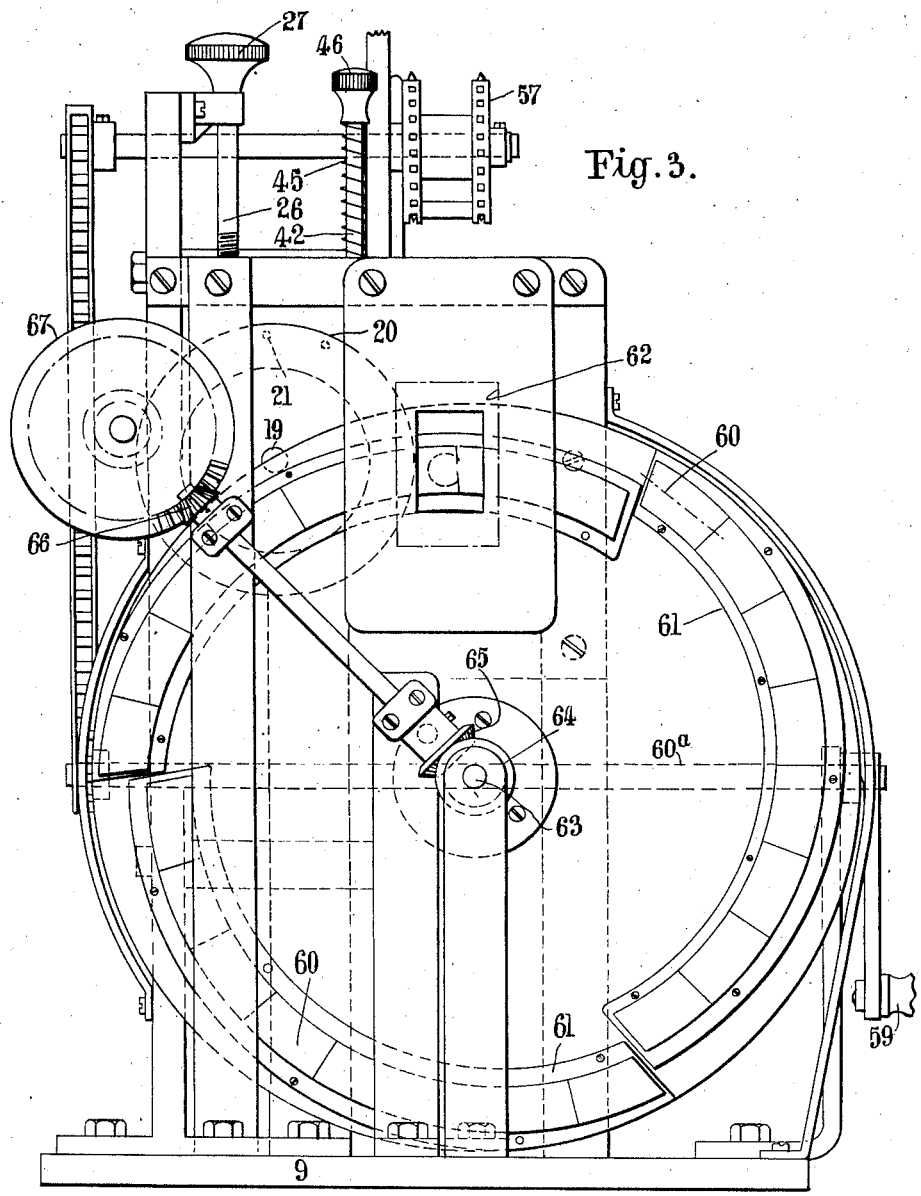

Sept. 1, 1925.  
S. H. CROCKER  
1,551,644  
CINEMATOGRAPHIC APPARATUS  
Filed Jan. 11, 1924  
4 Sheets-Sheet 4

Patented Sept. 1, 1925.

1,551,644

UNITED STATES PATENT OFFICE.

SAMUEL HENRY CROCKER, OF LONDON, ENGLAND.

CINEMATOGRAPHIC APPARATUS.

Application filed January 11, 1924. Serial No. 685,682.

*To all whom it may concern:*

Be it known that I, SAMUEL HENRY CROCKER, subject of the King of Great Britain, residing 131, Winston Road, London, N. 16, England, have invented new and useful Improvements in Cinematographic Apparatus, of which the following is a specification.

This invention relates to cinematographs of the type adapted to operate a continuously moving film and has for its object to provide a cinematograph comprising a revolving optical system set at the front of the film, means for moving the film edgewise and lengthwise to adjust the movements of the film to the movements of the members of the revolving optical system and a moving optical system set at the back of the film adapted to cause the beam of light transmitted therethrough to move successively with each member of the revolving optical system through which a picture is being projected at the front of the film.

It has for a further object the provision in such cinematograph of means for centering the film picture at the gate mask or the like and preferably with means for adjusting each member of the revolving optical system in its position in the said system and for adjusting the film between the lower edge of the film gate and the driving sprocket roller or the like.

And in order that the invention may be better understood, it will now be described with reference to the accompanying drawings in which:—

Fig. 1 is a front elevation of the relevant portion of one form of cinematograph of the type to which the invention relates with the invention applied thereto.

Fig. 2 is a side elevation of Fig. 1.

Fig. 3 is a rear elevation of Fig. 1.

Fig. 4 is an elevation of a detail hereinafter referred to.

Figure 5:
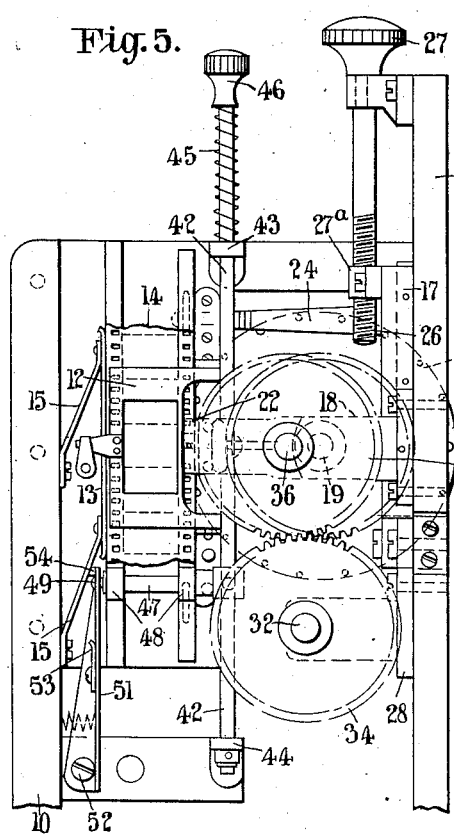
Fig. 5 is a front elevation of a portion of the apparatus with the ring of lenses removed.
Figure 6:
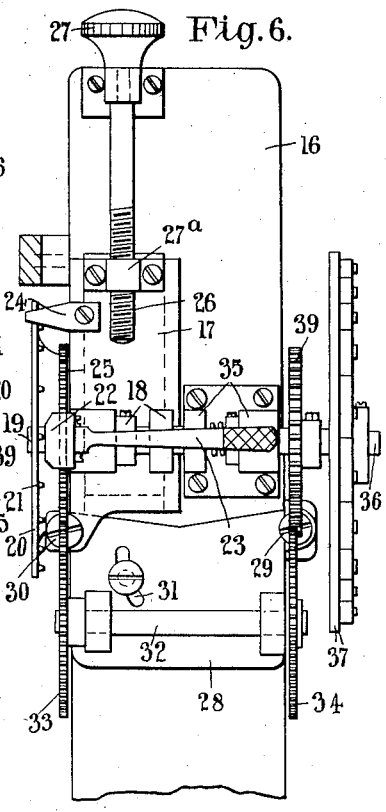
Fig. 6 is a sectional side elevation of Fig. 5.
Figure 7:
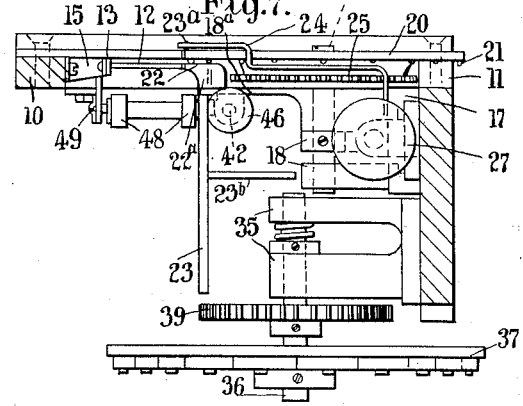
Fig. 7 is a plan of Fig. 5.
Figure 8:
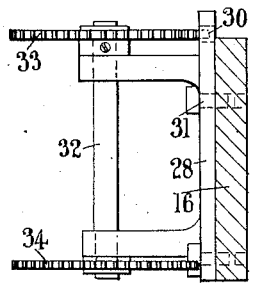
Fig. 8 is a sectional plan of part of the gearing.

In the drawings, 9 is a base plate carrying suitable standards and framework for supporting the various parts of the apparatus. Two of these standards 10 and 11 support a plate having an aperture of the size of two pictures which has a film gate 12, (Figs. 5 and 6) arranged at the aperture. 13 is a thin bar arranged parallel to and at the side of the film gate; this bar consequently comes parallel with the edge of the film 14. The bar 13 is held in a resilient manner by the parallel strip springs 15 and is adapted to move in parallel lines. Another standard 16 carries towards its upper end a slide 17, adapted to work on suitable guides. 18 is a bearing projecting from and moving with the slide 17. This bearing accommodates a spindle 19, which carries a roller in the form of a disc 20 having teeth 21, projecting therefrom (see Figs. 5, 6 and 7); in the preferred arrangement being described, these teeth are set apart the same distance as the centres of cinematographic pictures on a film. The arrangement of the parts is such that the roller 20 is held and adapted to rotate in the plane of the film 14, at the side of the film-gate 12 and opposite to the side at which the film bar is set. 22 is a flat surface on a piece or shoe 22$^a$ provided with a free arm 23 which is held in a resilient manner close to the teeth 21 of the roller 20, adjacent the position where these teeth engage the perforations in the film, to keep a tooth in engagement with a perforation, while the perforation is passing between the side of the roller 20 and the flat surface 22. The shoe 22$^a$ and arm 23 are carried by a flexible projection 18$^a$ from the bearing 18 and by pressing the free end of the arm 23 to the right (Fig. 7) the surface 22 is removed from the teeth 21 to allow the edge of the film to be inserted. The flexible movement is limited by the stop 23$^b$ carried by the arm 23.

A thin sliding piece 23 having a curved recess in the edge adapted to fit the curvature of the roller is arranged close to the roller and with its length parallel the line of the film. This piece 23$^a$ is held in position by a bent arm 24, attached to the slide 17 and is thereby adapted to move with the roller when the latter is adjusted vertically by the slide for the purpose of centering the film.

25 is a toothed wheel on the spindle 19 and between the roller 20 and the bearing 18. The slide 17 together with the roller 20 and wheel 25 are adjusted in a vertical direction by the screw stem 26, rotated by the head 27. The stem 26 is prevented moving vertically and consequently the travelling nut like bearing 27ᵃ on the slide 17 is caused to move.

28 is a plate pivoted at 29 to the standard 16, so as to turn to a slight angular extent thereon. This plate is linked by a suitable slot and screw 30, Fig. 6, to the lower end of the slide 17, and thus when the slide 17 moves vertically the plate turns on the pivot 29. 31 is a guide slot for this action working over a screw. The plate 28 carries bearings for a spindle 32 on the ends of which toothed wheels 33 and 34 are mounted. These wheels are of the same diameter and pitch as the toothed wheel 25, the wheel 33 meshing with the wheel 25. In the intermediate position of the slide 17, the wheels 33 and 25 come in the same plane, but when adjusted up or down as the plate 28 turns on the pivot 29, the spindle 32 is out of parallel with the spindle 19 and consequently the wheel 33 is not quite in the same plane as the wheel 25, but owing to the connection 30 between the slide 17 and plate 28, the wheels remain in mesh. 35 is a bearing fixed to the standard 16 for a spindle 36, which latter carries the disc 37, supporting the ring of lenses 38. 39 is a toothed wheel on the spindle 36, of the same diameter and pitch as the wheel 34, with which it meshes. In elevation it will be seen from Fig. 6 that the axis about which the plate 28 can turn passes through the meshing point of the gears 34 and 39; consequently they will remain in gear in all positions of adjustment of the slide 17.

It will be seen that the spindle 36 of the ring of lenses is parallel to the roller spindle 19 in all positions of adjustment and is in a line half the width of a picture nearer the film-gate. Means are also provided for adjusting the spindle lengthwise for focussing purposes.

The ring of lenses (Figs. 1, 2, 6 and 7) comprises the disc 37 provided with the required number of apertures arranged in the form of a ring and spaced so that they are adapted to hold the lenses 38 with their optical centres a little less apart than the centres of cinematographic pictures.

Simple or compound lenses may be employed and each is preferably held in a separate frame such as 40 (Fig. 4) adjustably fixed over its aperture in the disc, so that each lens is separately adjustable. One method for altering and adjusting the positions of the lenses is as shown in Fig. 4, where 41 are perforations or slots in the frame adapted to receive screws. Each frame is placed over its aperture in the disc and is secured to the disc by screws a little smaller than the perforations or width of the slots in the frame 40 whereby each lens may be altered and adjusted to the extent of the difference in the size of the perforations and the size of the screws.

The number of the lenses 28 in the ring and the number of teeth 21 on the roller 20 are equal and the difference in the spacing of the centres of the lenses and the spacing of the teeth 21 is required to produce the stationary effect in the projected pictures.

42 (Figs. 5 and 7) is an operating rod arranged at the side of the film-gate which rod works in bearings 43 and 44 longitudinally in the direction of the film and is kept pressed upwards by a compression spring 45 coming beneath an operating knob 46.

A small spindle 47 is attached to the rod 42 at right angles to the length and a roller 48 is set upon the spindle, whereby, the roller is adapted to be pushed down by pressure upon the knob 46 of the spring actuated rod. The end 49 of the spindle 47 opposite to the end attached to the rod 42 is arranged to move in a slot 50 in a guide piece 51, provided and set parallel to the rod at the opposite edge of the film (Figs. 1, 2, 5 and 7). The guide piece 51 is held so that it is free to oscillate upon a pivot 52 at the lower end and is held inclined towards the rod by one of the springs 15, engaging an extension 54 thereon. The slot 50 in the guide piece 51 is of less length than the stroke of the rod 42 and is bevelled at the bottom to present a sloping surface to the end of the spindle to facilitate its leaving the slot, whereupon it pushes the slotted guide piece backwards by sliding edgewise against the bevelled part 53 of the guide piece. The extension 54 at the upper end of the guide piece 51 is placed so that when it is pushed backwards it pushes the resiliently disposed bar 13 back from the edge of the film and permits the film to be freed so that the roller 48 in moving downwards bears on and draws down the film; when the roller 48 moves upwards it thus leaves an adequate film loop between the lower edge of the film-gate and the driving sprocket roller as hereinafter more fully explained. A shutter 55 is provided with curved slots 56 of a width equal to the height of one picture and arranged so that one end of each slot is further from the centre of the shutter than the other end of the slot by a distance equal to the width of the slot.

In one example of arranging the movable optical system at the back of the film, cylindrical lenses 60 (Fig. 3) are cut angularly at the ends and placed end to end over the curved slots 56 in the shutter 55, so that they form a curved strip of lenses covering each curved slot. Two curved side pieces 61 are arranged to hold the cylindrical lenses in position upon each curved slot in the shutter. The axes of the lenses 60 are substantially tangential to a circle struck from the centre of the shaft 63 and in radial section from the same centre each lens is of plano-convex, double convex or other suitable cross section.

A cylindrical lens, such as shown dotted at 62 with its axis vertical is preferably used in combination with the series of cylindrical lenses 60 and is arranged and fixed on the light side of the exposure aperture and so that the two ends of the cylindrical formation of the lens are in the line of the film at the exposure aperture and so that the cylindrical formation of the series of cylindrical lenses 60 is carried across the cylindrical formation of the fixed cylindrical lens 62, when the shutter is rotated. A sprocket roller 57 is arranged above the film-gate and another 58 is arranged below the film-gate. The upper sprocket roller is preferably provided with ratchet connection to its spindle.

The usual centrifugal device (not shown) for cutting off the light is applied at the exposure aperture. Suitable gear such as that indicated in Figs. 1, 2 and 3 of the drawings is provided. This comprises an operating handle 59, the spindle 60ª of which carries the lower sprocket roller 58 and a bevel wheel 61ª which meshes with a bevel pinion 62ª on the spindle 63 of the shutter. The spindle 36 of the disc carrying the ring of lenses is driven from a bevel pinion 64 on the spindle 63 through bevel gears 65, 66 and 67 and a gear wheel on the spindle of the latter meshing with the gear 39. The usual accessories required to complete the cinematograph for practical use are also applied to the cinematograph and used therewith.

The operation will be readily understood, the film is placed in the gate 12 and any aperture in the film engaged with a tooth 21. Upon driving, the toothed wheel 39 causes the toothed wheel 25 to be rotated synchronously therewith through the gears 34 and 33. If and when it is necessary to centre the picture at the gate mask, the head 27 is turned to raise or lower the slide 17, which communicates a similar movement, to the roller 20 and consequently to the film to effect the desired object. This action can take place readily during projection.

When necessary to move the film down to maintain an adequate film loop between the film gate and the driving sprocket roller 58 the head 46 is depressed and removes the strip 13 from the edge of the film, as previously explained. The arm 23 is pressed back and the movements of the parts then cause the film to disengage itself from the teeth 21 leaving the film free to be moved down. The film passes from beneath the roller 48 to the top of the sprocket 58 (Fig. 2) and it will be appreciated that when the roller 48 is moved down from its upper position shown in the figure, it will carry with it the film and upon the roller moving up, a loop or adequate slackness of the film will be left between it and the top of the sprocket 58.

What I claim as my invention and desire to secure by Letters Patent of United States of America is:—

1. A cinematograph of the type adapted to operate a continuously moving film comprising a revolving optical system at the front of the film, means for moving the film edgewise and lengthwise, and a moving optical system set at the back of the film and adapted to cause the light to successively move with each member in turn of the revolving optical system at the front of the film.

2. A cinematograph of the type adapted to operate a continuously moving film comprising a ring of revolving lenses at the front of the film, means for moving the film edgewise and lengthwise and a moving optical system set at the back of the film and adapted to cause the light to successively move with each member in turn of the revolving optical system at the front of the film.

3. A cinematograph of the type adapted to operate a continuously moving film, comprising a revolving optical system at the front of the film, means for moving the film edgewise and lengthwise and a shutter with curved slots carrying cylindrical lenses set at the back of the film and adapted to cause the light to successively move with each member in turn of the revolving optical system at the front of the film.

4. A cinematograph of the type adapted to operate a continuously moving film comprising a ring of revolving lenses at the front of the film, means for moving the film edgewise and lengthwise and a shutter with curved slots carrying cylindrical lenses set at the back of the film, and adapted to cause the light to successively move with each member in turn of the revolving optical system at the front of the film.

5. A cinematograph of the type adapted to operate a continuously moving film, comprising a revolving optical system at the front of the film, means for moving the film edgewise and lengthwise a moving optical system set at the back of the film and adapted to cause the light to successively move with each member in turn of the revolving optical system at the front of the film and a cylindrical lens arranged and fixed on the light side of the exposure aperture so that the two ends of the cylindrical formation of the said lens are in the line of the film at the exposure aperture.

6. A cinematograph of the type adapted to operate a continuously moving film comprising a ring of revolving lenses at the front of the film, means for movably fixing each of the lenses on the ring to allow adjustment to be made if subsequently required, means for moving the film edgewise and lengthwise, and a moving optical system set at the back of the film and adapted to cause the light to successively move with each member in turn of the revolving optical system at the front of the film.

7. Cinematograph apparatus as claimed in claim 1, including means adapted to maintain the film loop between the lower edge of the film gate and the lower or driving sprocket roller.

8. Cinematograph apparatus as claimed in claim 1, in which the means for centering the film picture at the gate mask comprises means for adjusting the means for moving the film edgewise and lengthwise.

9. Cinematographic apparatus as claimed in claim 1, in which the means for centering the film picture at the gate mask comprises means for adjusting the position of a toothed roller or the like causing the edgewise and lengthwise movements of the film past the exhibiting position.

10. Cinematographic apparatus as claimed in claim 1, in which the means for centering the film picture at the gate mask comprises means for adjusting the position of a toothed roller or the like causing the edgewise and lengthwise movements of the film past the exhibiting position and in which the said toothed roller or the like is mounted on a spindle which is carried in a bearing adapted to be moved by a slide for the purposes set forth.

11. Cinematographic apparatus as claimed in claim 1, in which the means for centering the film picture at the gate mask comprises means for adjusting the position of a toothed roller or the like causing the edgewise and lengthwise movements of the film past the exhibiting position and in which the said toothed roller or the like is mounted on a spindle which is carried in a bearing adapted to be moved by a slide, the said spindle having mounted thereon a gear wheel adapted to mesh with another driving gear in all positions of adjustment, for the purposes set forth.

12. A cinematograph of the type adapted to operate a continuously moving film comprising a ring of revolving lenses at the front of the film, mounted on a spindle having a gear wheel thereon, a toothed roller or the like for moving the film edgewise and lengthwise past the exhibiting position, a spindle on which said toothed roller or the like is mounted, a bearing carrying the spindle of the toothed roller adapted to be moved by a slide, a gear wheel on said last mentioned spindle, intermediate gearing between the gear wheel on the spindle of the ring of revolving lenses and the gear wheel on the toothed roller spindle, to cause said gear wheels to rotate in synchronism, means for maintaining synchronous mesh between the gears, whatever the position of adjustment of the toothed roller, and a moving optical system set at the back of the film and adapted to cause the light to successively move with each member in turn of the revolving optical system at the front of the film.

13. A cinematograph of the type adapted to operate a continuously moving film comprising a ring of revolving lenses at the front of the film, mounted on a spindle having a gear wheel thereon, a toothed roller or the like for moving the film edgewise and lengthwise past the exhibiting position, a spindle on which said toothed roller or the like is mounted, a bearing carrying the spindle of the toothed roller adapted to be moved by a slide, a gear wheel on said last mentioned spindle, intermediate gearing, comprising two gear wheels mounted upon a spindle carried by a pivoted plate connected to the means for adjusting the position of the toothed roller or the like, between the gear wheel on the spindle of the ring of revolving lenses and the gear wheel on the toothed roller spindle, to cause said gear wheels to rotate in synchronism, means for maintaining synchronous mesh between the gears, whatever the position of adjustment of the toothed roller, and a moving optical system set at the back of the film and adapted to cause the light to successively move with each member in turn of the revolving optical system at the front of the film.

In testimony whereof I have signed my name to this specification.

SAMUEL HENRY CROCKER.